(12) United States Patent
Schneeman et al.

(10) Patent No.: US 9,928,498 B2
(45) Date of Patent: Mar. 27, 2018

(54) SYSTEM, APPARATUS AND METHOD FOR SEGREGATING DATA IN TRANSACTIONS VIA DEDICATED INTERFACE ELEMENTS FOR ISOLATED LOGIC AND REPOSITORIES

(75) Inventors: Brent T. Schneeman, Austin, TX (US); Dennis Kashkin, Austin, TX (US); Eric M. Carr, Austin, TX (US); Mark R. Reynolds, Austin, TX (US); Matthew W. Kinman, Austin, TX (US); Charles R. Poff, III, Austin, TX (US); Douglas A. Squires, Austin, TX (US); Daniel A. Herrera, Fremont, CA (US)

(73) Assignee: HomeAway.com, Inc., Austin, TX (US)

( * ) Notice: Subject to any disclaimer, the term of this patent is extended or adjusted under 35 U.S.C. 154(b) by 0 days.

(21) Appl. No.: 13/329,182

(22) Filed: Dec. 16, 2011

(65) Prior Publication Data

US 2013/0159169 A1    Jun. 20, 2013

(51) Int. Cl.
*G06Q 20/08* (2012.01)
*G06Q 20/32* (2012.01)
*G06Q 20/12* (2012.01)

(52) U.S. Cl.
CPC ........... *G06Q 20/322* (2013.01); *G06Q 20/12* (2013.01)

(58) Field of Classification Search
CPC .............................. G06Q 20/322; G06Q 20/12
USPC .......................................................... 705/39
See application file for complete search history.

(56) References Cited

U.S. PATENT DOCUMENTS

| | | | |
|---|---|---|---|
| 7,461,077 B1* | 12/2008 | Greenwood | |
| 7,974,942 B2* | 7/2011 | Pomroy | G06F 17/30286 707/610 |
| 8,191,152 B1* | 5/2012 | Barker | G06Q 40/00 704/244 |
| 2008/0172598 A1* | 7/2008 | Jacobsen et al. | 715/224 |
| 2012/0284527 A1* | 11/2012 | Nagpal et al. | 713/189 |

* cited by examiner

*Primary Examiner* — Jessica Lemieux
(74) *Attorney, Agent, or Firm* — Knobbe, Martens, Olson & Bear, LLP

(57) ABSTRACT

Embodiments relate generally to computer software and computing devices, and more particularly, to a system, an apparatus and a method configured to segregate data at an interface of a computing device to facilitate on-line electronic payment transactions. In one embodiment, a method includes presenting fields configured to accept a first type of data and to accept a second type of data for an on-line electronic payment transaction. The method includes generating an initialization signal for transmission to an isolated data management system to initialize a portion of a memory associated with first type of data, responsive to an interaction with a field, receiving data from the field, and generating a save signal to save the data from the field in a portion of the memory. This can be responsive to a second interaction with the field.

22 Claims, 11 Drawing Sheets

SYSTEM, APPARATUS AND METHOD FOR SEGREGATING DATA IN TRANSACTIONS VIA DEDICATED INTERFACE ELEMENTS FOR ISOLATED LOGIC AND REPOSITORIES

BRIEF DESCRIPTION OF THE INVENTION

Embodiments of the invention relate generally to computer software and computing devices, and more particularly, to a system, an apparatus and a method configured to segregate data at an interface of a computing device and at an isolated data manager to facilitate on-line electronic payment transactions, whereby dedicated interface elements, such as fields, can sequence through multiple states.

BACKGROUND OF THE INVENTION

Traditional techniques for providing on-line electronic payment transactions include a web-based form (e.g., an HTML form) in which a user can enter information about the user and an article being purchased, such as product identifiers, etc. Also, such web-based forms enable a user to enter financially-related data into another form. For securing financially-sensitive data payments, various organizations and/or companies in the payment card industry have established card security policies, procedures and guidelines. There exists a number of conventional approaches to safeguarding data used in on-line electronic payments. While functional, there is a variety of drawbacks associated with the conventional approaches to using data in typical on-line electronic payment transactions.

Some conventional approaches to make on-line electronic payments may commingle non-financial information (e.g., "out-of-scope" information) and financial information (e.g., "in-scope" information). In some cases, both types of information are stored in a common storage platform and are equally accessible. Thus, some consumers of the non-financial information may have access unnecessarily to the financial information, thereby increasing opportunities of unauthorized data access.

In other approaches, a user is presented one or more merchant-related web pages to peruse potential purchases and input user-related data in on-line web forms. But when the user is to make payment, the user may be directed to another web page typically controlled by a third party that provides payment services. The transition to another uniform resource locator ("URL") of another web page to facilitate payment (i.e., a transition away from an on-line merchant checkout page) causes a back-and-forth experience by the user when making payments conventionally. For example, a payment processes usually requires that the user interact with two or more windows, which interrupts the user experience during purchasing goods or services. Users also experience numerous visual transitions, disruptions and delays in the process of making payment. It is also expected that, after each stage, some users decide not to continue with the relatively cumbersome payment process, resulting in the loss of potential customers or customers and less favorable conversions.

In view of the foregoing, it is be desirable to provide an apparatus, a system, and a method for overcoming the drawbacks of the conventional on-line electronic payment processes.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Design, publishing, and other types of applications such as Dreamweaver®, Shockwave®, Flash®, Drupal and Fireworks® may also be used to implement the described techniques. The described techniques may be varied and are not limited to the examples or descriptions provided.

Figure 1:
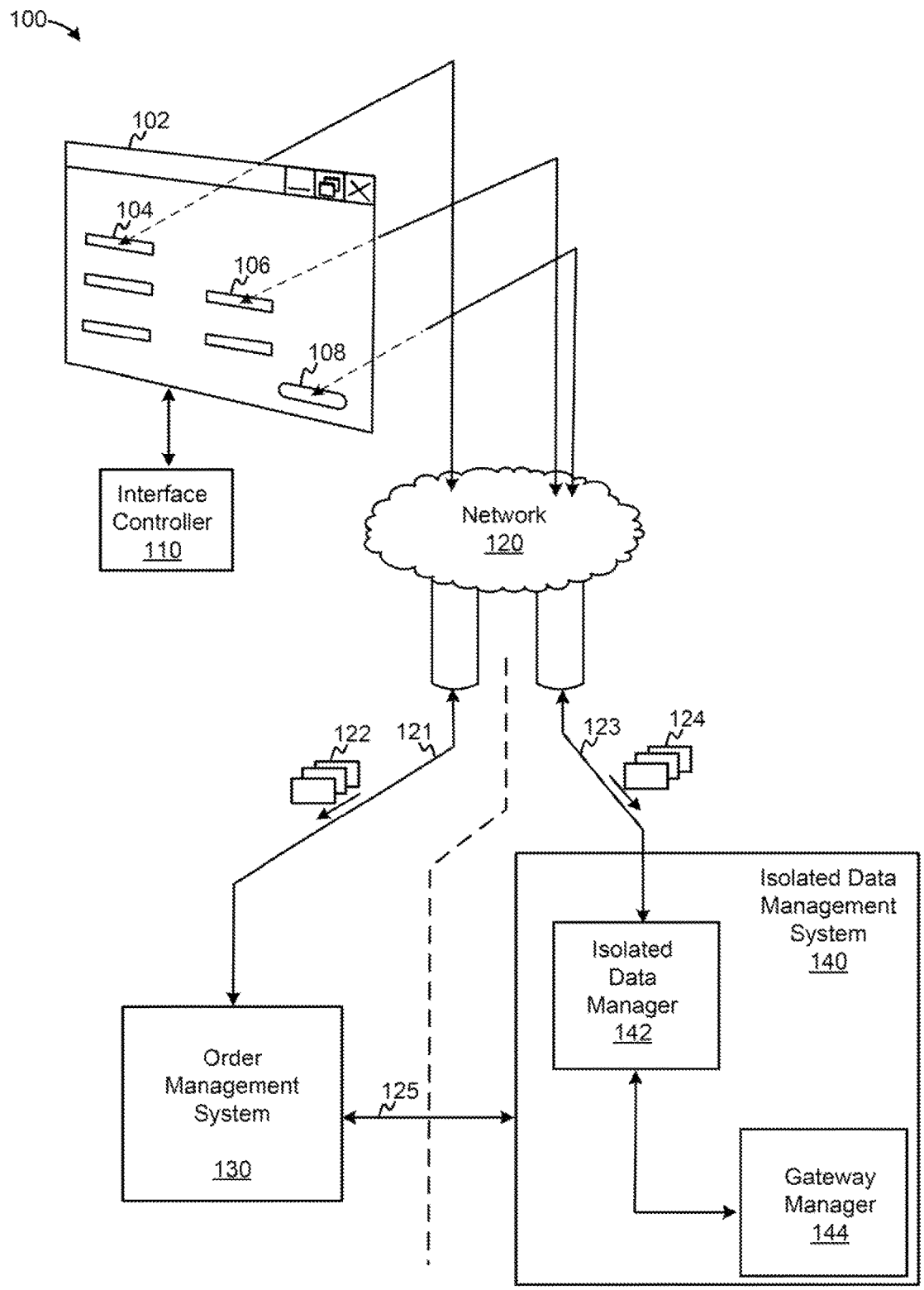
FIG. 1 depicts an example of segregating data to facilitate on-line electronic payment transactions in accordance various embodiments.

FIG. 1 depicts an example of segregating data to facilitate on-line electronic payment transactions in accordance various embodiments. Diagram 100 depicts an example of an interface 102 of computing device, such as for a desktop or a mobile device, that includes one or more processors ("processor") coupled to a storage, such as a memory. The processor of the computing device executes instructions to provide for data segregation at the front-end in interface 102 and/or at the back-end in an order management system 130 and/or an isolated data management system 140. Order management system 130 can include processors and storage, and can be configured to manage an ordering process in which a payment process is managed by isolated data management system 140. Isolated data management system 140 and one or more of its components are configured to provide a secure computing environment in which to use and process sensitive information relating to on-line electronic payment transactions. Isolated data management system 140 is configured to use or process a minimum amount of sensitive information. In some embodiments, the data used and processed by isolated data management system 140 and one or more of its components are mutually exclusive with the data used and processed by order management system 130. Order management system 130 can include logic for representing the ordering process in abstraction as a "cart," or an "on-line shopping cart," and can be implemented as on-line merchants or stores. At checkout, order management system 130 can determine a total cost for an order, including additional charges due to, for example, shipping and handling, as well as taxes, if applicable. In some embodiments, order management system 130 (or another entity) can be configured to generate or otherwise cause interface 102 to be presented (e.g., to a user) as, for example, a check-out web page. Interface 102 includes a first subset of fields 106 (e.g., dedicated fields) that are dedicated for receiving a first type of data 124, such as in-scope data, for isolated data management system 140. Further, order management system 130 (or another entity) can be configured to generate or otherwise cause interface 102 to include a second subset of fields 104 that are dedicated for receiving a second type of data 122, such as out-of-scope data, for order management system 130. An interface controller 110 can be configured to control the functionality of interface 102, including the disposition of data in fields 104 and 106 by, for example, transmitting the data via network 120 over either data path 121 or 123. According to various embodiments, examples of interface 102 include physical interfaces (e.g., a telephone or a display on the telephone) and virtual interfaces (e.g., a web page, panel, window, display, palette, tab, screen, or the like).

According to some embodiments, an interaction with a field, such as field 106, can activate a command or otherwise cause a function to be performed. In one example, an interaction with field 106 can include selecting field 160 (e.g., by activating a "focus" on command). Responsive to the selection, an initialization signal can be generated for transmission to isolated data management system 140 to initialize a portion of a memory associated with selected field 106, responsive to an interaction with field 106. For example, a user can cause a cursor or an object (e.g., a finger on a touchscreen) to engage field 106 for entering data. Another interaction with field 106 can activate another command or otherwise cause another function to be performed. Such an interaction with field 106 can include deselecting field 106 (e.g., by activating a "blurring" command). Responsive to deselecting field 106, a save signal can be generated for transmission to isolated data management system 140 to save the data from field 106 in a portion of the memory. For example, a user can cause a cursor or an object (e.g., a finger on a touchscreen) to disengage field 106 (e.g., after entering data) and engage any other portion of interface 102.

In view of the foregoing, structures and/or functions of various systems, apparatuses and methods can serve to facilitate on-line electronic payment transactions. An interface 102 that includes different fields 104 and 106 for accepting out-of-scope data 122 and in-scope data 124, respectively, enables the segregation of data during and after use (e.g. when stored) by implementing logic and memory of order management system 130 separate from isolated data management system 140. By combining the data retrieving functions in association with interface 102, interface 102 (or a window thereof) need not transition away to facilitate payment. Thus, principal data or in-scope data 124 need not be transmitted to or along with data destined for order management system 130. The presentation of fields 104 and 106 in a window and/or in interface 102 can be concurrent with the generation of the initialization signal and the save signal for transmission along data path 123, and concurrent with transmitting data 122 along data path 121. Also, the presentation of fields 104 and 106 can be maintained without transitioning from an associated uniform resource locator ("URL"). Therefore, a user's experience need not be disrupted with a transition to a payment-specific web page.

Further, the visual characteristics of interface 102 (i.e., the aspects related to financial information) can be maintained and/or modified under the control of an entity that manages order management system 130 rather than being subject to the use of visual characteristics (e.g., colors, layout, skins, etc.) defined by a third party payment service provider. Also, by segregating the retrieval of out-of-scope data 122 and in-scope data 124, in-scope data 124 is stored and used apart from out-of-scope data 122, thereby reducing the requirements to access in-scope data 124 when an entity or user is interested in accessing out-of-scope data 122. Moreover, data segregation also reduces the number of systems and/or processes through which in-scope data 124 travels, thereby enhancing security by reducing opportunities for inadvertent or unauthorized data access. Additionally, the logic of interface controller 110 facilitates the segregation of data by controlling the interactions with fields 106 to automatically process in-scope data 124 as a user interaction causes a cursor to enter and exit field 106. While data in isolated data management system 140 is segregated from that in order management system 130, a communications path 125 exists to coordinate an on-line electronic payment transaction. Order management system 130 is configured to halt the check-out process until isolated data management system 140 determines that it has acquired the necessary data (e.g., in-scope data) to proceed with the on-line electronic payment transaction. By halting the check-out process, the effects due to variations in Internet signal timing is reduced or eliminated, thereby avoiding financial discrepancies caused by proceeding with the check-out process before isolated data management system 140 has identified or acquired the necessary in-scope data for performing an on-line electronic payment transaction.

An interface element or object, such as "submit" 108, can be configured to generate a signal (e.g., a ready signal) to indicate to isolated data management system 140 that financial-related data, such as in-scope data 124, is valid and sufficient to complete the on-line electronic payment transaction. As used herein, the term "interface element" can refer to, at least in some embodiments, an entity or object in (or associated with) an interface to provide a function or method in association with data. For example, data fields in an interface can provide a user the means by which to supply input information. Isolated data management system 140 can include an isolated data manager 142 and optionally a gateway 144, which can be disposed external to isolated data management system 140 in some cases. In some embodiments, isolated data manager 142 can generate or otherwise implement interface 102 or portions thereof, such as fields 106, to solicit and/or receive in-scope data 124. In some embodiments, an isolated data manager 142 can include structures and/or functions equivalent to a payment island. Note that the terms "isolated data manager" and "isolated data management System" can be used to refer to an improved "payment island," as used herein. In some cases, interface controller 110 can operate as a client-side isolated data manager or a distributed "payment island." For example, isolated data manager 142 and/or isolated data management system 140 can be firewalled-off from other systems and networks, such as order management system 130.

Gateway 144 can be, configured to transmit the on-line electronic payment transaction to a financial institution, such as a bank, to transfer funds. Further, gateway 144 can be configured to tokenizing and capturing data associated with a transaction. For example, gateway 144 can generates tokens to replace sensitive data, such as principal data, with surrogate data and symbols, thereby removing systems and/or data from being described as being "in scope," and, therefore, need not adhere to Compliance to, for example, a standard governing on-line electronic payment transactions. Thus, gateway 144 can provide logic and data storage for token mapping, gateway mapping, and session mapping, among other things, with communications with isolated data manager 142.

As described herein, isolated data manager 142 cooperates with interface 102 to segregate principal data such that it traverse data path portion 123 independent of the secondary data. As used herein, the term "principal" data can refer to, at least in some embodiments, to a type of data that is designated or otherwise specified as data that is to be restricted in its transmission, use or storage, and thereby is restricted to isolated data manager 142 or isolated data management system 140, either of which can be structured or can operate to accomplish the aims of a payment island.

For example, data that may be sensitive, including financially-related data, or otherwise affect a user's privacy can be designated as principal data. Examples of principal data include data relating to a user's financial (e.g., banking or credit) account, health records, social security information, pension information, mother's maiden name, bank routing numbers, and other types of data affecting a user's privacy. A field configured to receive principal data can be described as being "dedicated" to receiving data of a first data type. By contrast, the term "secondary" data, as used herein, can refer to another type of data that is not designated or otherwise is not specified as data that is to be restricted in its use or storage. In some cases, secondary data includes non-financial data and may or may not include data other than principal data. A field configured to receive secondary data can be described as being "dedicated" to receiving data of a second data type. As used herein, the term "financial" data can refer to, at least in some embodiments, to data sufficient to effect a transfer of funds (e.g., as payment) from one account to another account.

In some embodiments, principal and/or secondary data can be defined by a proprietary specification or policy to ensure a certain level of precautions are undertaken to fulfill security requirements. Or, principal data and/or secondary data can be defined by a standard to which on-line merchants, payment service providers and payment application developers and integrators must comply to obtain or maintain a certification of compliance. As used herein, the term "in-scope" data can refer to types of data specified by a standard or a specification that requires a certain type of handling (e.g., as principal data) and data security measures. While in some cases in-scope data can require a minimum amount or level of restriction, as defined by a standard, in-scope data can include other data as well, such a social security numbers, or other personal information or identifiers. In-scope data may be defined as data that is of a type that is available to those only having a "need to know" to use or process the data. By contrast, the term "out-of-scope" data can refer to data that need not require specialized handling or be restricted as "in-scope" data.

An example of a standard is the Payment Card Industry ("PCI") Data Security Standard ("DSS") as maintained and governed by PCI Security Standards Council, LLC of Wakefield, Mass., U.S.A. The PCI DSS standard sets forth guidelines to protect cardholder data, which can include any information that is printed, processed, transmitted, or stored in any form on a payment card. In particular, a user's account data can include cardholder data and sensitive authentication data. In some embodiments, the "in-scope" data can be limited to at a minimum, a cardholder's name, a primary account number ("PAN") and an expiration date. In some cases, cardholder data also can include service code data. In-scope data can also include sensitive authentication data, such as full magnetic stripe data or equivalent (e.g., on-chip data), authorization codes, such as card identification number ("CID"), Card Authentication Values ("CAV2"), and the like. Sensitive authentication data also can include personal identification number ("PIN") information. Note that while "in-scope" data as used herein can describe data relating to the PCI DSS standard, the term is not intended to be limited to PCI DSS standard. Rather, "in-scope" data can refer to data that are identified as restricted in accordance with any policy, standard or specification.

Figure 2:
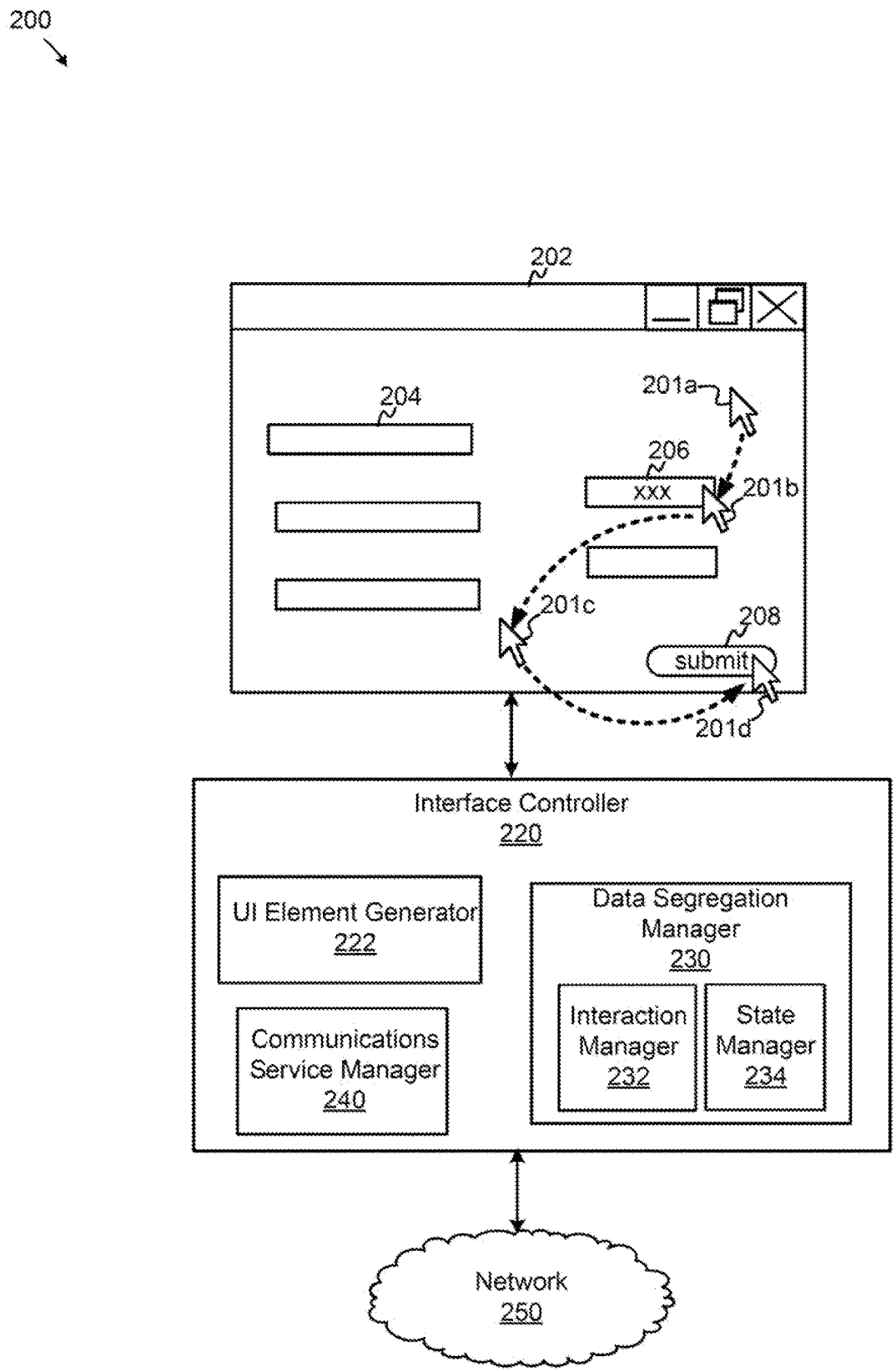
FIG. 2 depicts an example of an interface controller configured to facilitate data segregation at an interface, according to some embodiments.

FIG. 2 depicts an example of an interface controller configured to facilitate data segregation at an interface, according to some embodiments. Diagram 200 includes an interface controller 202 configured to generate an interface 202 with which data is segregated as a function of the type of data that is to be entered in one or more fields 204 and 206. Interface controller 202 also is configured to transmit data, such as principal data, from a client computing device to a destination computing environment in which the data is restricted. Thus, interface controller 202 can be referred to as a "payment island client," according to some implementations. Interface controller 202 includes a user interface ("UI") generator 222, a communications service manager 240, and a data segregation manager 230.

User interface generator 222 is configured to facilitate the presentation of interlace 202 (or window) as a single HTML form, according to some embodiments. Note that interlace 202 need not be limited to a single HTML form. Also, user interface generator 222 is configured to facilitate the presentation of fields 204 and 206 as interface elements, as well as the presentation of a data submission input ("submit") 208. User interface generator 222 can operate responsive to commands originating at an order management system 130 of FIG. 1. In at least one embodiment, user interface generator 222 is configured to generate interface 202 as an "outer" form that includes the functionality of data submission input ("submit") 208. Data entered into fields 206 are segregated from data entered into fields 204 so that user interface generator 222 can generate fields 206 as an "iframe element," such as an HTML inline frame or "iframe." In some embodiments, the iframes can be associated with executable instructions or commands, such as a JavaScript command, to determine an event relating to data entered into fields 206. An event, upon detection, can initiate further processing, such as transmitting the data (or signals related thereto) via network 250 to a destination computing environment to which the data is restricted, such as an isolated data manager 142 of FIG. 1. In the examples described below, the event can be an interaction with a field 206.

Communication services manager 240 is configured to facilitate the communications with interface 202. For example, communication services manager 240 can initiate transmission of data from fields 204 to an order management system and from fields 206 to an isolated data manager. In some embodiments, communication services manager 240 includes one or more Ajax applications to transfer principal data received into fields 206 to an isolated data manager based on Ajax events.

Data segregation manager 230 includes an interaction manager 232 and a state manager 234. State manager 234 is configured to manage or maintain the state of data associated with a field 206 (i.e., state manager 234 manages the state machine for iframe state sequencing). In a first state, the data associated with field 206 is being edited or is an editable state, and in a second state the data is being saved and/or validated. In some embodiments, state manager 234 determines that a field 206 is an edit state responsive to a first interaction (or event) associated with that field. Field 206 transitions to a save state responsive to a second interaction (or event) associated with that field. State manager 234 is configured to determine the state of each field 206 (i.e., whether each state is in an edit state or save state), according to some examples. Note that when each field is in a "saved" state, the selection of the submission 208 can generate a ready signal indicating that an order management system can proceed with the check-out process.

Interaction manager 232 is configured to detect such interactions. Such interactions can include a cursor or any object (e.g., a finger on a touchscreen) that engages (selects) field 206 or disengages from (deselects) field 206. So in an event in which a cursor enters field 206 to select that field, interaction manager 232 instructs communication services manager 240 to transmit a signal to indicate that data stored in an isolated data manager is invalid (i.e., the data is deemed "dirty" and unavailable to consummate the transaction). In one example, upon interaction manager 232 detecting selection of field 206, a JavaScript command is executed. An example of such a command is the implementation of an onFocus event attribute. The onFocus event attribute detects the entry into field 206 as a first interaction. Upon the onFocus event, another command is executed to transmit a signal specifying that previous data related to field 206 is invalid. The signal can be sent as a "wipe" signal via an Ajax event POST to the isolated data manager. Once the wipe signal is received by the isolated data manager, the field enters an edit state. In another event, the cursor exits field 206 to deselect that field. Interaction manager 232 then instructs communication services manager 240 to transmit a signal to indicate that data from field 206 is valid (i.e., the data is deemed "safe" to use in the on-line electronic payment transaction). In one example, interaction manager 232 detects the deselection of field 206, and in response, a JavaScript command is executed. An example of such a JavaScript command is the implementation of an onBlur event attribute. The onBlur event attribute detects the exit of the cursor from field 206 as the second interaction. Upon the onBlur event, another command is executed to transmit another signal specifying that data related to field 206 is valid. The signal can be sent as a "save" signal via an Ajax event POST to the isolated data manager. Once the save signal is received by the isolated data manager, the field enters a save state.

To illustrate operation of interface controller 220, consider the interoperability of communications service manager 240, interaction manager 232, and state manager 234 in view of a cursor and its interaction with a field 206. First consider that state manager 234 determines that a null state initially exists for field 206 when the cursor is at position 201a. When the cursor moves to position 201b (i.e., the cursor enters or selects field 206), state manager 234 determines that field 206 is in an edit state. In this state, communications service manager 240 transmits a "wipe" signal to indicate the data (e.g., previously-stored data) is invalid. Next, consider that the cursor moves to position 201c, at which time field 206 is deselected. This movement is an "exiting" interaction. State manager 234 determines that field 206 enters a saved state, and, in response, communications service manager 240 transmits a "save" signal. Further, consider that when the cursor moves to position 201d and submit 208 is selected, either the isolated data manager continues to wait for additional in-scope data to carry out the on-line electronic payment transfer (i.e., one or more fields 206 are not in the saved state), or the isolated data manager transmits a "ready" signal (i.e., all fields 206 are in the saved state).

Figure 3:
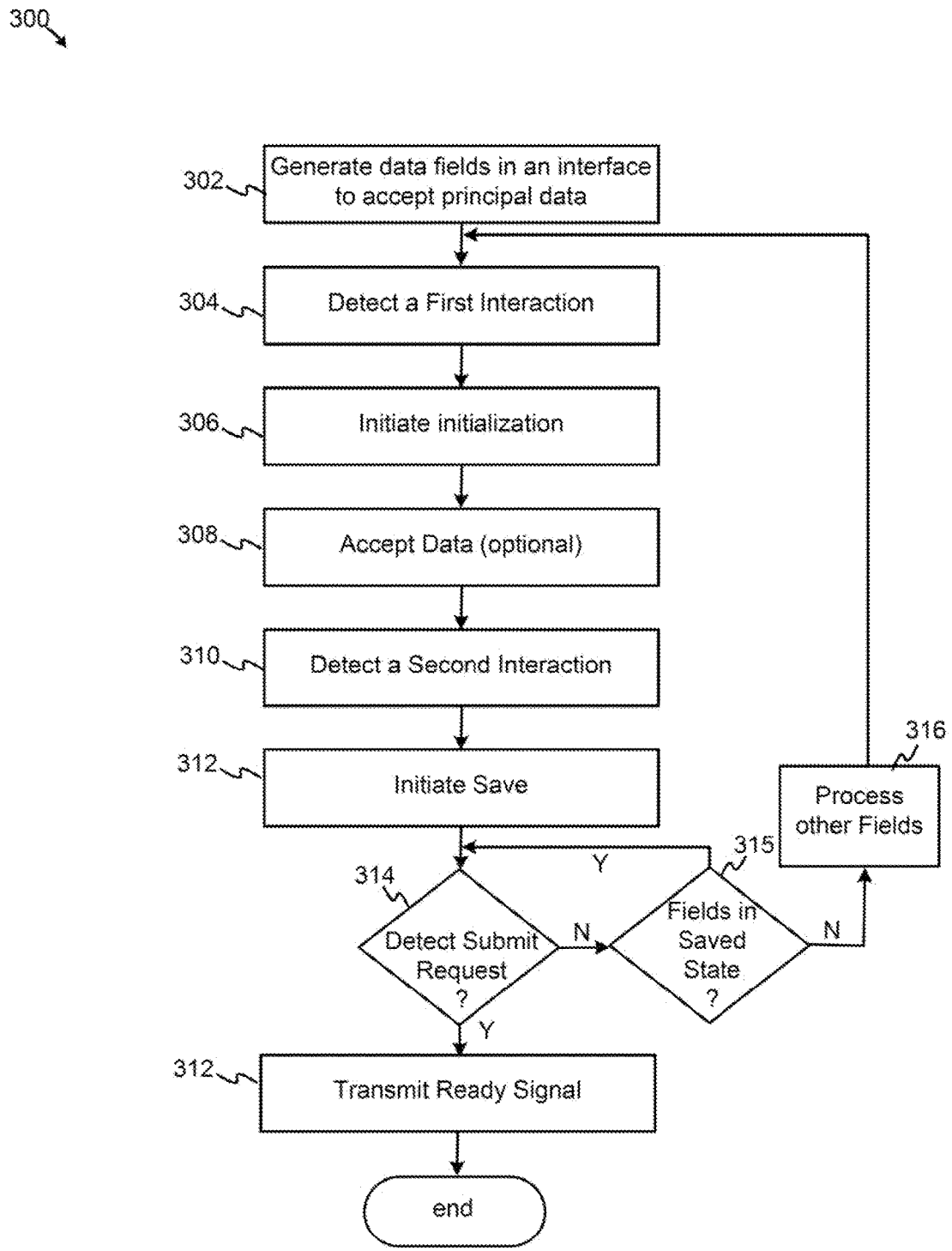
FIG. 3 is a diagram depicting a flow for retrieving principal data into an isolated data manager to facilitate on-line electronic payment transactions, according to some embodiments.

FIG. 3 is a diagram depicting a flow for retrieving principal data into an isolated data manager to facilitate on-line electronic payment transactions, according to some embodiments. Flow 300 generates data fields in an interface at 302 to accept principal data, including in-scope data. At 304, a first interaction is detected (e.g., at an iframe). In response, a command can be activated to transmit an initialization signal. An isolated data manager, upon receiving the initialization signal, operates to "wipe," discard or invalidate data stored in a memory location into which data from the data field is to be saved. At 306, flow 300 initiates the initialization of the data, thereby causing the field to enter an edit state. At 308, principal data can be accepted into the field. Next, a second interaction is detected at 310. In response, a command can be activated to transmit a save signal. An isolated data manager, upon receiving the save signal, operates to initiate a save operation at 312 to "save" or store principal data at the memory location. The field is in a saved state and the stored data is available for use in the on-line electronic payment transaction. At 314, a determination is made whether a submit request has been generated. If not, then flow 300 continues to 315 at which a determination is made whether fields are in a saved state (e.g., all fields including principal data are in a saved state). If not, flow 300 continues back to 304 to repeat the above; otherwise, flow 300 determines that principal data fields are in a saved state and the flow loops through 314 until a submit request is generated. When a submit request is detected at 314, then the flow continues to 312 at which the flow causes a ready signal to be generated to indicate that necessary in-scope data is available to the isolated data manager. An example of flow 300 is depicted in FIG. 6.

Figure 4:
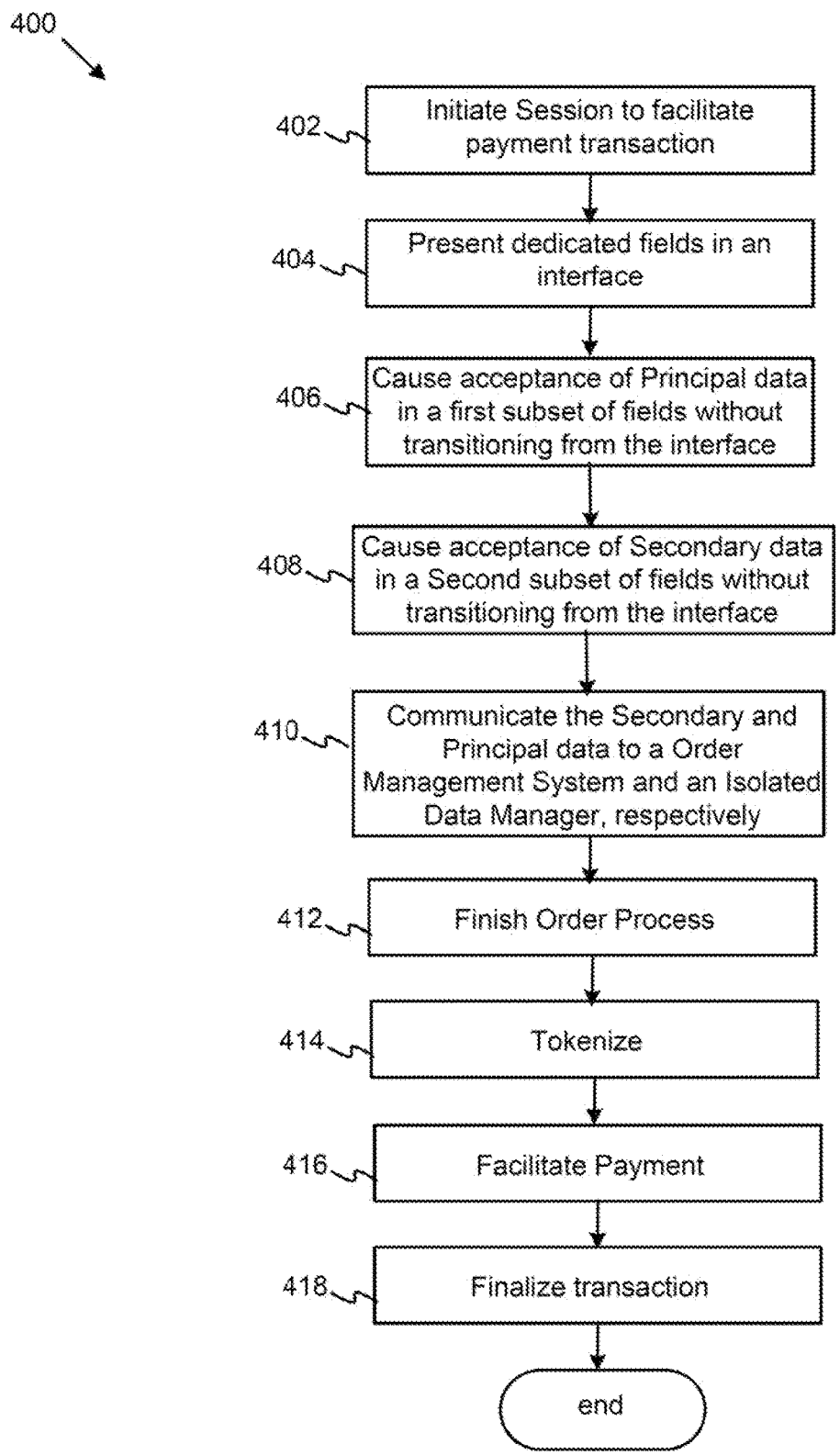
FIG. 4 is a diagram depicting a flow to facilitate a check-out process using segregated principal data and secondary data, according to some embodiments.
Figure 7:
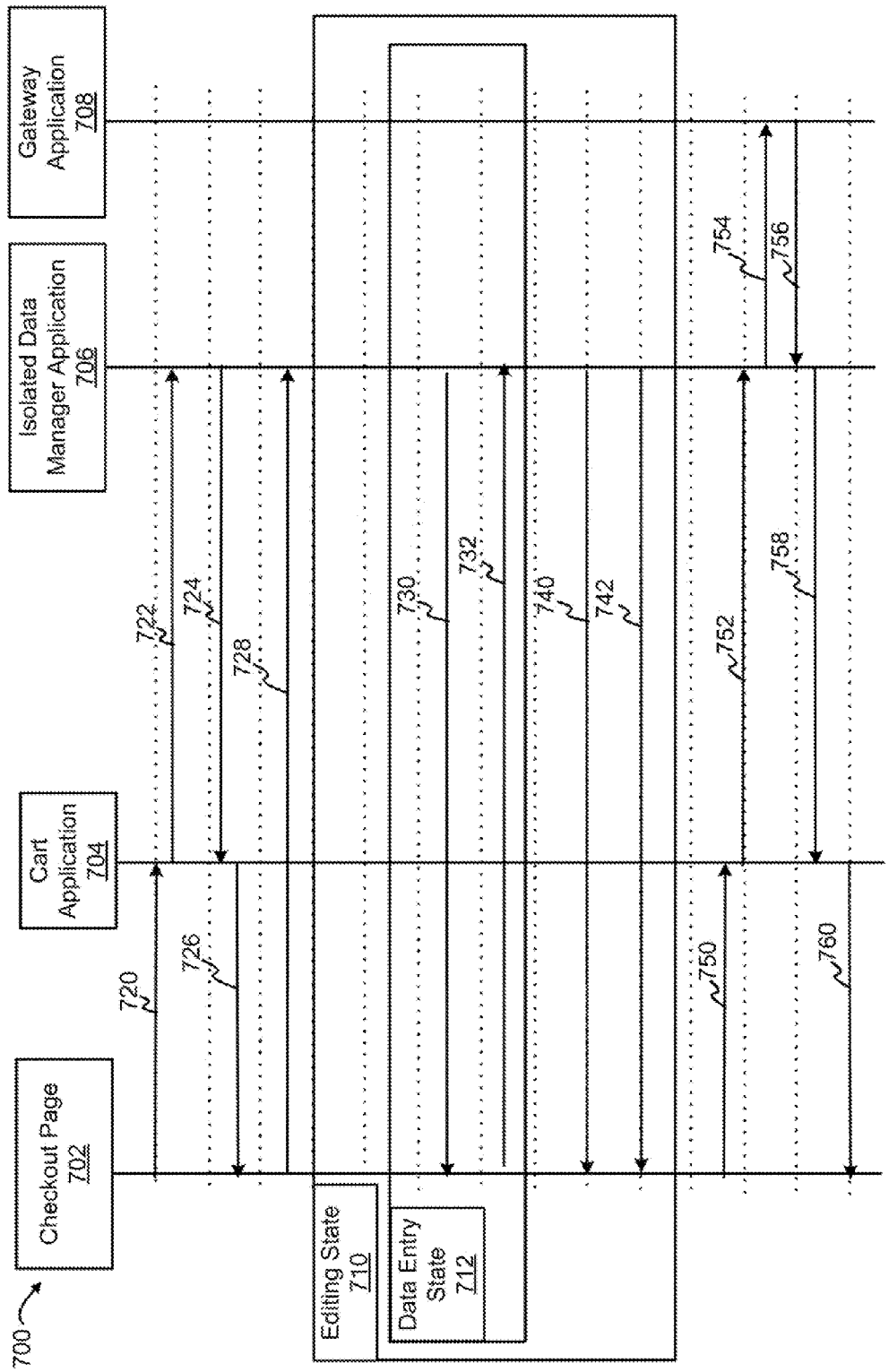
FIG. 7 is an example of a timing sequence diagram for facilitating a check-out process using segregated principal data and secondary data, according to some embodiments.

FIG. 4 is a diagram depicting a flow to facilitate a check-out process using segregated principal data and secondary data, according to some embodiments. Flow 400 generates initiates a session to facilitate a check-out process including an on-line electronic payment transaction at 402. At 404, dedicated fields in an interface are presented when the check-out page is rendered. Flow 400 causes acceptance of principal data in a first subset of fields without transitioning from the interface and/or URL at 406, and acceptance of secondary data in a second subset of fields without transitioning from the interface and/or URL at 408. At 410, the principal and secondary data are communicated to an isolated data manager and an order management system, respectively. Upon receiving a ready signal and completing the ordering process, the on-line order process is finished at 412. At 414, a gateway can tokenize one or more portions of principal data, and can make payment at 416. At 418, the transaction is finalized and a receipt is transmitted from the gateway to the user. An example of flow 400 is depicted in FIG. 7.

Figure 5:
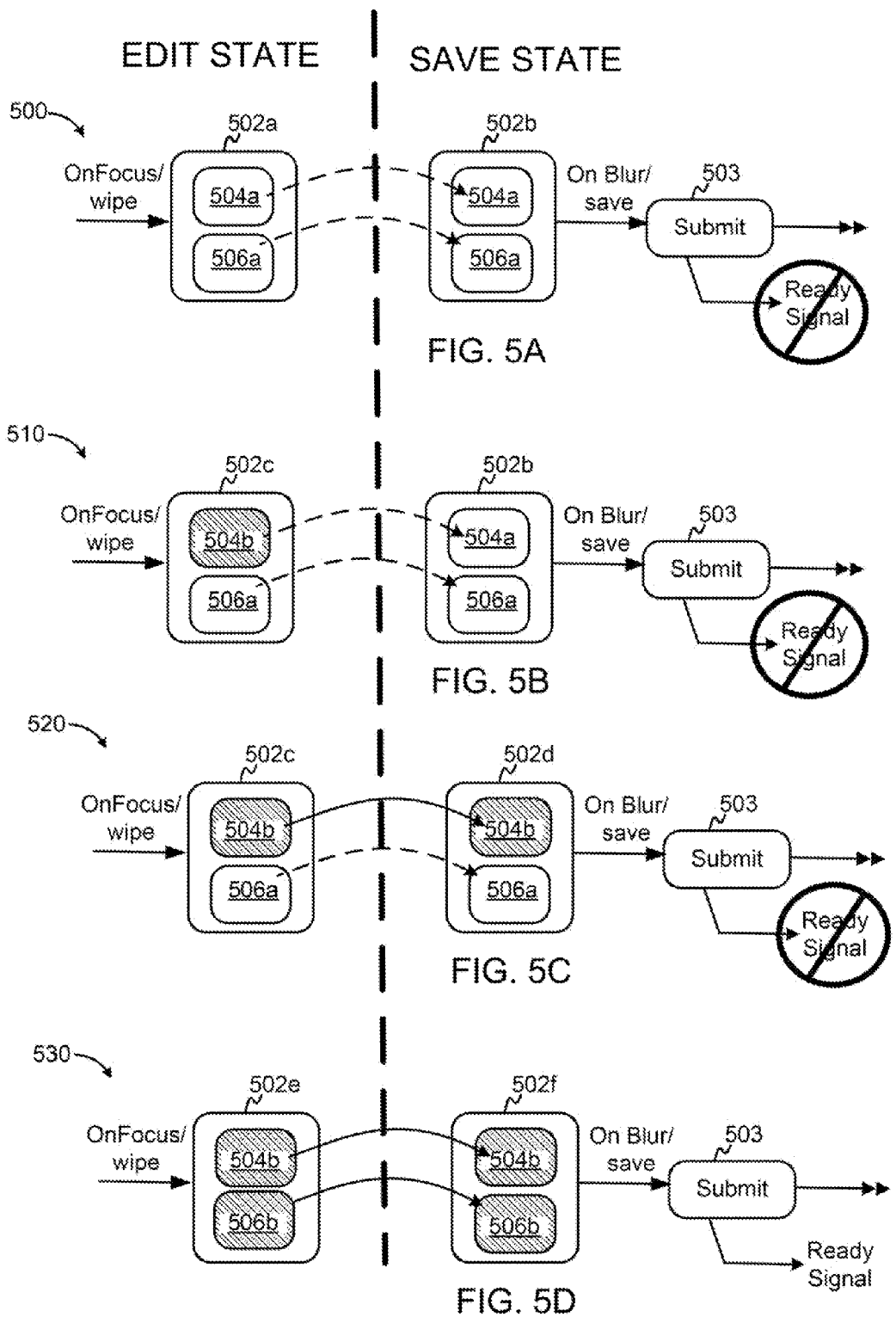
FIGS. 5A to 5D depict different fields for principal data in a form with the fields transitioning through multiple states, according to some embodiments.

FIGS. 5A to 5D depict different fields for principal data in a form with the fields transitioning through multiple states, according to some embodiments. In FIGS. 5A to 5D, fields associated with null data are represented without cross-hatching, whereas a field either in an edit state or save state is indicated by cross-hatching. In FIG. 5A, diagram 500 depicts that form 502*a* includes fields 504*a* and 506*a* for accepting principal data, and are shown in a null state. Therefore, form 502*b* shows that the same fields are not in a saved state as they include no cross-hatching. In FIG. 5B, diagram 510 depicts that form 502*c* includes fields 504*b* and 506*a* for accepting principal data, and field 504*b* is an edit state. Note, however, neither field in that same form 502*b* is indicated as being in a save state. In FIG. 5G, diagram 520 depicts that form 502*c* includes fields 504*b* and 506*a* for accepting principal data, and field 504*b* has been in an edit state. Further, field 504*b* has transitioned to a saved state in form 502*d*. In FIG. 5D, diagram 530 depicts that form 502*e* includes fields 504*b* and 506*b* for accepting principal data, and fields 504*b* and 506*b* has been in an edit state. Further, fields 504*b* and 506*b* have each transitioned to a saved state in form 502*f*, as indicated by the cross-hatching in both fields. Note that the selection of submit 504 generates a ready signal only in FIG. 5D as each field in the form is in a saved state, unlike in FIGS. 5A to 5C.

Figure 6:
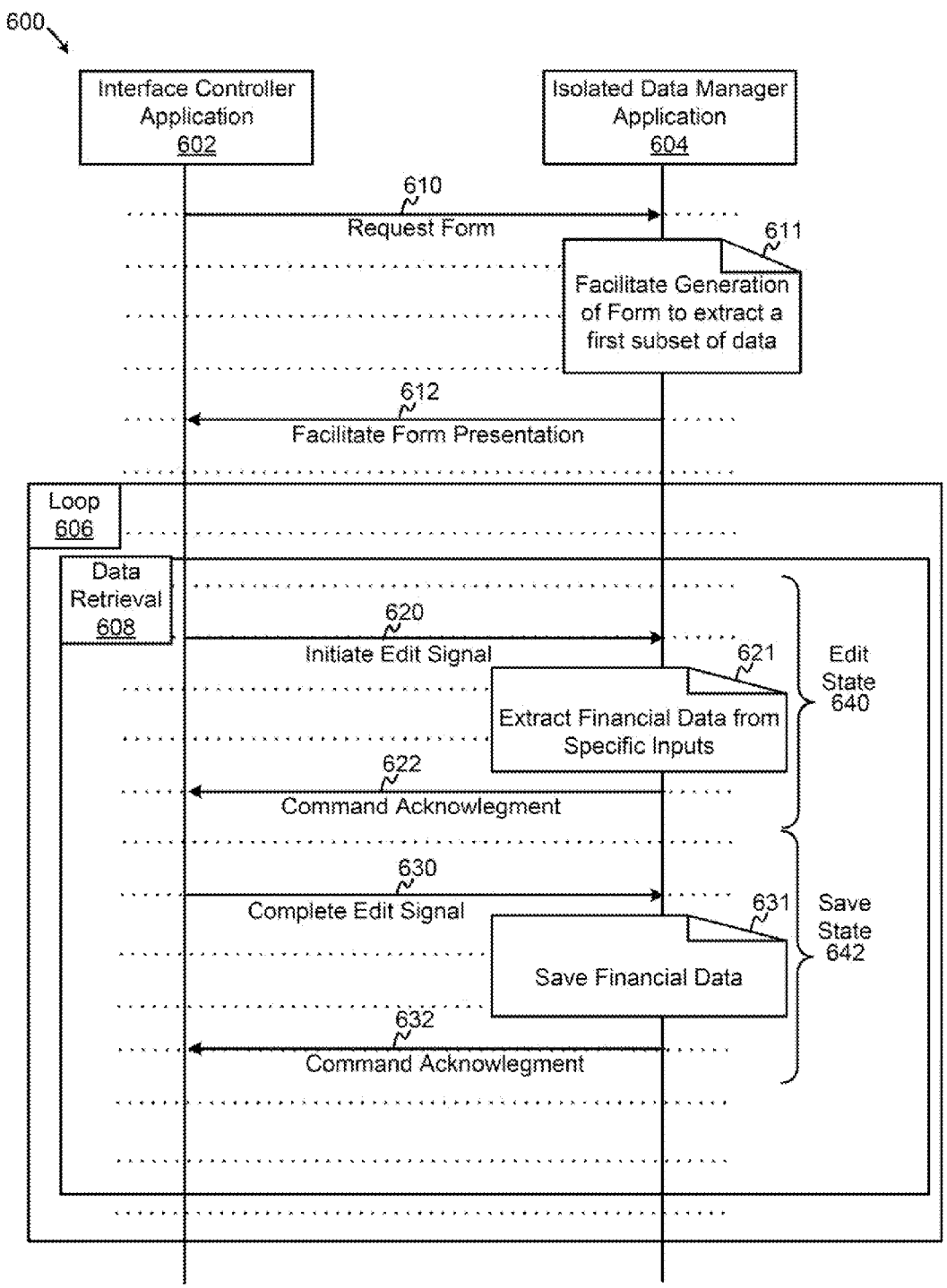
FIG. 6 is an example of a timing sequence diagram for retrieving principal data in a segregated manner for on-line electronic payment transactions, according to some embodiments.

FIG. 6 is an example of a timing sequence diagram for retrieving principal data in a segregated manner for on-line electronic payment transactions, according to some embodiments. Timing sequence diagram 600 depicts the timing of signals transmitted between an interface controller application 602 and an isolated data manager application 604. For example, interface controller application 602 and isolated data manager application 604 can respectively constitute a payment island client and a payment island. Signal 610 is a request signal to obtain a form. For example, signal 610 can be a GET signal to retrieve a form via an iframe source attribute specifying location of an HTML form to obtain in-scope data. Isolated data manager application 604 can generate the HTML form including iframes to solicit in-scope data at 611. Examples of in-scope data include, but are not limited to, a cardholder name, PAN, CVV, an expiration date, and AVS data. Then, isolated data manager application 604 causes the form to be rendered via signal 612 in an interface using interface controller application 602.

Loop 606 is performed for each field from which principal data is to be extracted. Data retrieval 608 includes an edit state 640 and a save state 642, whereby data retrieval 608 depicts a mutually exclusive choice between two signal sequences (e.g., editing signals and saving signals). Signal 620 can be an initialization or "wipe" signal to invalidate data already associated with a particular field in preparation for obtaining new data. Principal data is obtained at 621, with an acknowledgement signal 622 transmitted to interface controller application 602. Signal 630 can be a "save" signal to store valid data from a particular field during a save state 642. Principal data is saved at 631, with an acknowledgement signal 632 transmitted to interface controller application 602. Note that while "fields" are described herein as sources of data, any interface element can provide data as principal data, including drop-down menus, selected radio buttons, etc.

FIG. 7 is an example of a timing sequence diagram for facilitating a check-out process using segregated principal data and secondary data, according to some embodiments. Timing sequence diagram 700 depicts the timing of signals transmitted among application checkout page 702, a cart application 704 (e.g., order management system 130 of FIG. 1), an isolated data manager application 706 and a gateway application 708. Signal 720 is a request signal to initiate a check-out process. In response, cart application 704 generates a request 722 for a new check-out session with isolated data manager application 706 and gateway application 708. Isolated data manager application 706 transmits session information 724 including URLs for iframes. Cart application 704 transmits data 726 to render a checkout page with iframes referencing isolated data manager application 706. Further, checkout page waits for the submit button to be selected. When it is selected, checkout page 702 transmits a GET ready? signal to isolated data manager application 706. One of three signal groups can be generated as a result in editing state 710. First, isolated data manager application 706 can transmit a return message 730 that it is waiting for other save states for other fields. Subsequently, checkout page 702 transmits another a GET ready? signal 732. Second, isolated data manager application 706 can transmit a validation error message 742 when there is a validation error regarding the data (e.g., incorrect PAN). Third, isolated data manager application 706 can transmit a success message 742 when the data is validated, thereby facilitating order submission. Thereafter, checkout page 702 causes a message 750 including invoice details to be transmitted to cart application 704, which, in turn, transmits the invoice details in message 752 to isolated data manager application 706. Isolated data manager application 706 transmits a request 754 to gateway application 708 to tokenize the data and pay the amount due. In response, gateway application 708 generates a return message 756 including transaction receipt information. Isolated data manager application 706 receives the message and transmits message 758 including the transaction receipt information. In turn, cart application 704 transmits transaction receipt information 760 to the user at checkout page 702.

Figure 8:
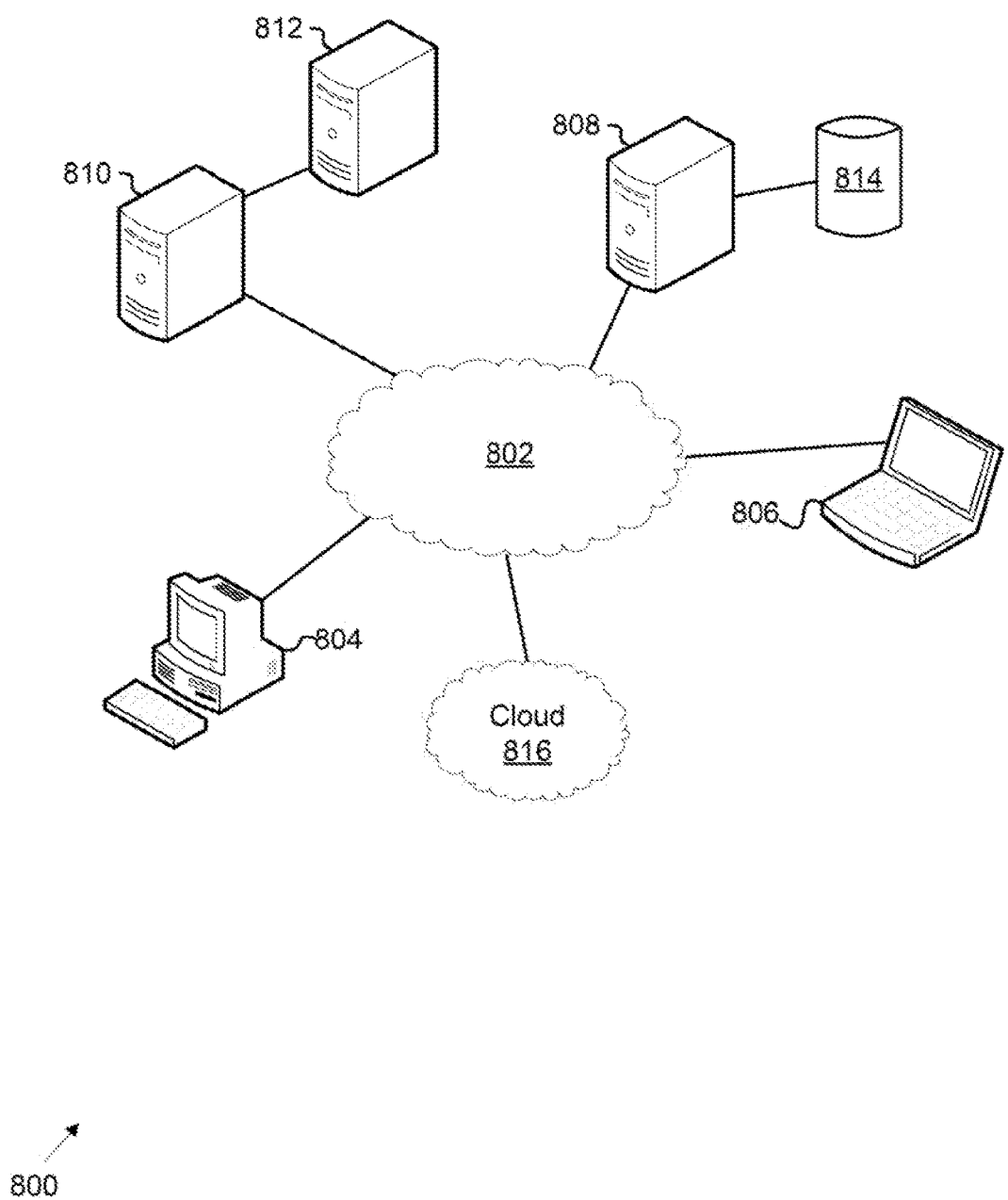
FIG. 8 illustrates an exemplary system for implementing an isolated data management framework.

FIG. 8 illustrates an exemplary system for implementing an isolated data management framework. Here, system 800 includes network 802, clients 804-806, servers 808-812, repository 814, and computing cloud 816. In some examples, the number, type, configuration, and data communication protocols shown may be varied and are not limited to the examples described. As shown here, clients 804-806 and servers 808-812 may be configured to implement, install, or host the described techniques as applications. Data may be stored in database 814, which may be implemented as any type of data storage facility such as a database, data warehouse, data mart, storage area network (SAN), redundant array of independent disks (RAID), or other type of hardware, software, firmware, circuitry, or a combination thereof configured to store, retrieve, organize, access, or perform other operations. Likewise, clients 804-806 and servers 808-812 may be implemented as any type of computing device, hardware, software, firmware, circuitry, or a combination thereof for purposes of providing computational and processing capabilities for the techniques described herein. For example, server 808 may tie used with repository 814 to host an application or set of applications that are configured to perform the described techniques for isolated data management using the framework described herein. Server 808 can operate as an application server ("app server") for providing an isolated data manager application, or to server iframe-based forms. Data associated with any operation may be stored, retrieved, or accessed from repository 814. Still further, computing cloud 816 may be used to provide processing and/or storage resources beyond those provided by server 808 or a cluster of servers (e.g., servers 810-812) in order to install, implement, or otherwise run program instructions for the described techniques. In some embodiments, server 810 can be implemented as a payment gateway to provide gateway applications, and server 812 can be a server at a banking institution, whereby servers 810 and 812 communicate to complete an on-line electronic payment transaction. As described, the techniques for isolated data management may be implemented as a standalone application on any of clients 804-806 or servers 808-812. In some examples, if a database management system (i.e., DBMS; not shown) is used with repository 814, the described techniques may also be implemented as an application stored therein.

As shown, clients 804-806, servers 808-812, computing cloud 816, and/or a combination thereof may also be used to implement the described techniques as a distributed application. Different techniques may be used to implement the described techniques as a distributed application, including deployment as software-as-a-service (i.e., SaaS) or as a distributed application in accordance with specifications such as WSDL (i.e., web services distributed language). Other specifications, protocols, formats, or architectures may be used to implement the described techniques, without limitation, and are not limited to the examples shown and described. Further, system 800 and the above-described elements may be varied and are not limited to those shown and described.

Figure 9A:
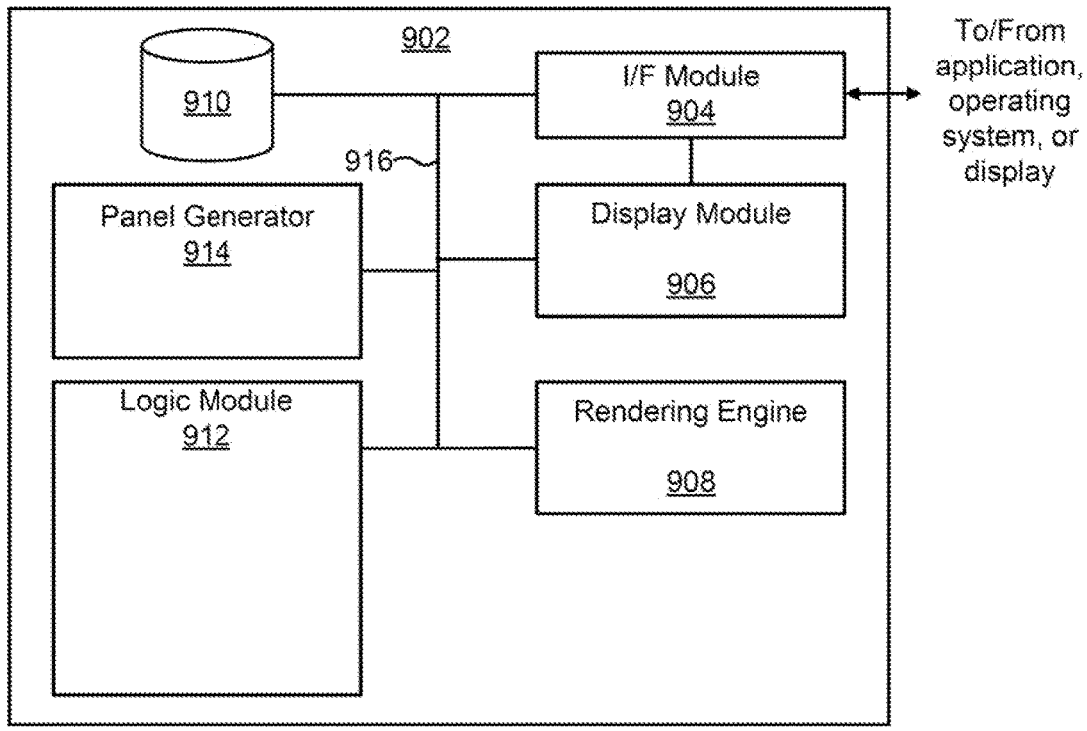
FIGS. 9A and 9B illustrate examples of panel presentation application for generating an interface and its fields and responding to interactions with the same when making an on-line electronic payment, according to various embodiments.

FIG. 9A illustrates an example of panel (e.g., a window) presentation application of implementing an interface and its fields when making an on-line electronic payment, according to various embodiments of the invention. Here, application 902 includes interface ("I/F") module 904, display module 906, rendering engine 908, repository 910, logic module 912, panel generator 914, and data bus 916. In some examples, the number and type of elements shown and described may be varied and are not limited to the descriptions provided. In some examples, the above-described elements can be implemented as part, component, or module of application 902. As an example, application 902 can be implemented as either a web browser for a software product, and can have panel presentation and payment functionality implemented as part of application 902. Logic module 912 can be implemented as software, hardware, circuitry, or a combination thereof to implement control logic for the described techniques for panel presentation. As used herein, the term "panel," at least in one embodiment, can refer to displays, palettes, tabs, windows, screens, portions of an interface, and the like, including, but not limited to an outer frame in which one or more iframes are associated.

In some examples, logic module 912 can be configured to control panel generator 914 to form panels, or windows including fields formed with iframes. Rendering engine 908 can be configured to as a layout engine for web pages, for example, to manipulate both content (e.g., as expressed in or including HTML, XML, image files, etc.) and formatting information (e.g., as expressed in or including CSS, XSL, etc.) for rendering the data or information as one or more panels on interface 906 (FIG. 9). Interface module 904 can exchange panel presentation data, including content data, financial data, as well as other data (e.g., data in and out of scope), between application 902 and another application (e.g., a host, client, web services-based, distributed (i.e., enterprise), application programming interface ("API"), operating system, program, procedure or others) that can use data and information generated from panel generator 914 to render presented panels on a display screen. In other examples, the above-described techniques and elements can be varied in design, implementation, and function and are not limited to the descriptions provided.

Figure 9B:
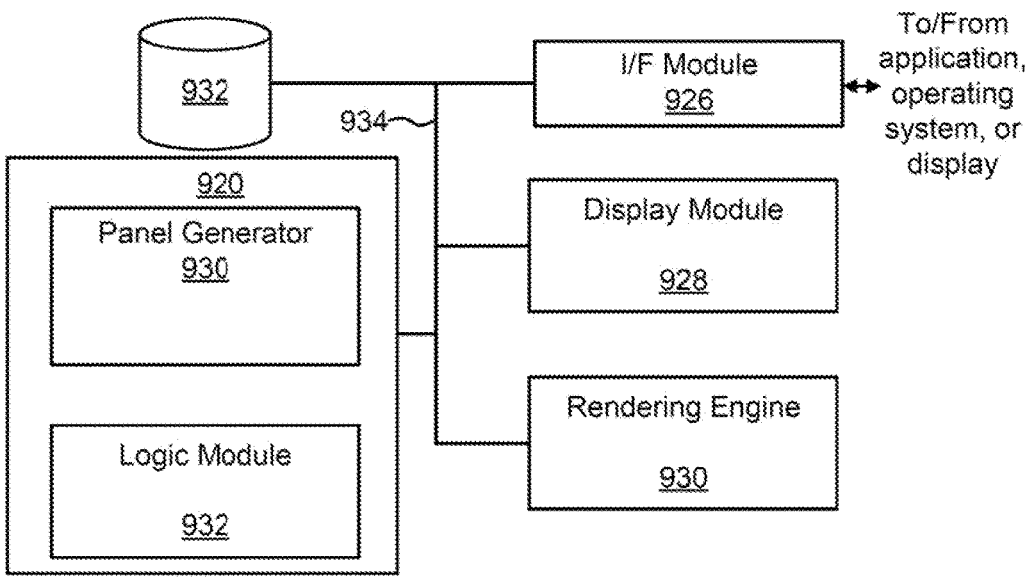

FIG. 9B illustrates an alternative example for making an on-line electronic payment, according to one embodiment of the invention. Here, application 920 includes panel generator 922 and logic module 924, which can have equivalent functionality as 912 of FIG. 9A. Further, application 920 is shown in data communication with interface ("I/F") module 926, display module 928, rendering engine 930, and repository 932. Data bus 934 can be configured to send or receive data among application 920, I/F module 926, display module 928, rendering engine 930, and repository 932. In other examples, more, fewer or different elements can be used and implemented without limitation to the examples provided above.

In some examples, logic module 924 and panel generator 922 can be implemented as part of application 920, which can be implemented separately from other functional components or modules, such as interface module 926, display module 928, rendering module 930, and repository 932. Data bus 934 can be implemented to communicate data over a given port between application 920 and interface module 926, display module 928, rendering module 930, and repository 932. In other words, application 920 can be implemented as a standalone application or as a component (i.e., module) of another application. Data or information (e.g., representations, tags, descriptors, links, and hierarchical relationships) associated with a panel can be stored in repository 932, which can be implemented using a database; data store, data warehouse, or any other type of data repository or structure. In other examples, more, fewer, or different modules can be used to implement the described techniques for panel presentation and are not limited to those provided.

Figure 10:
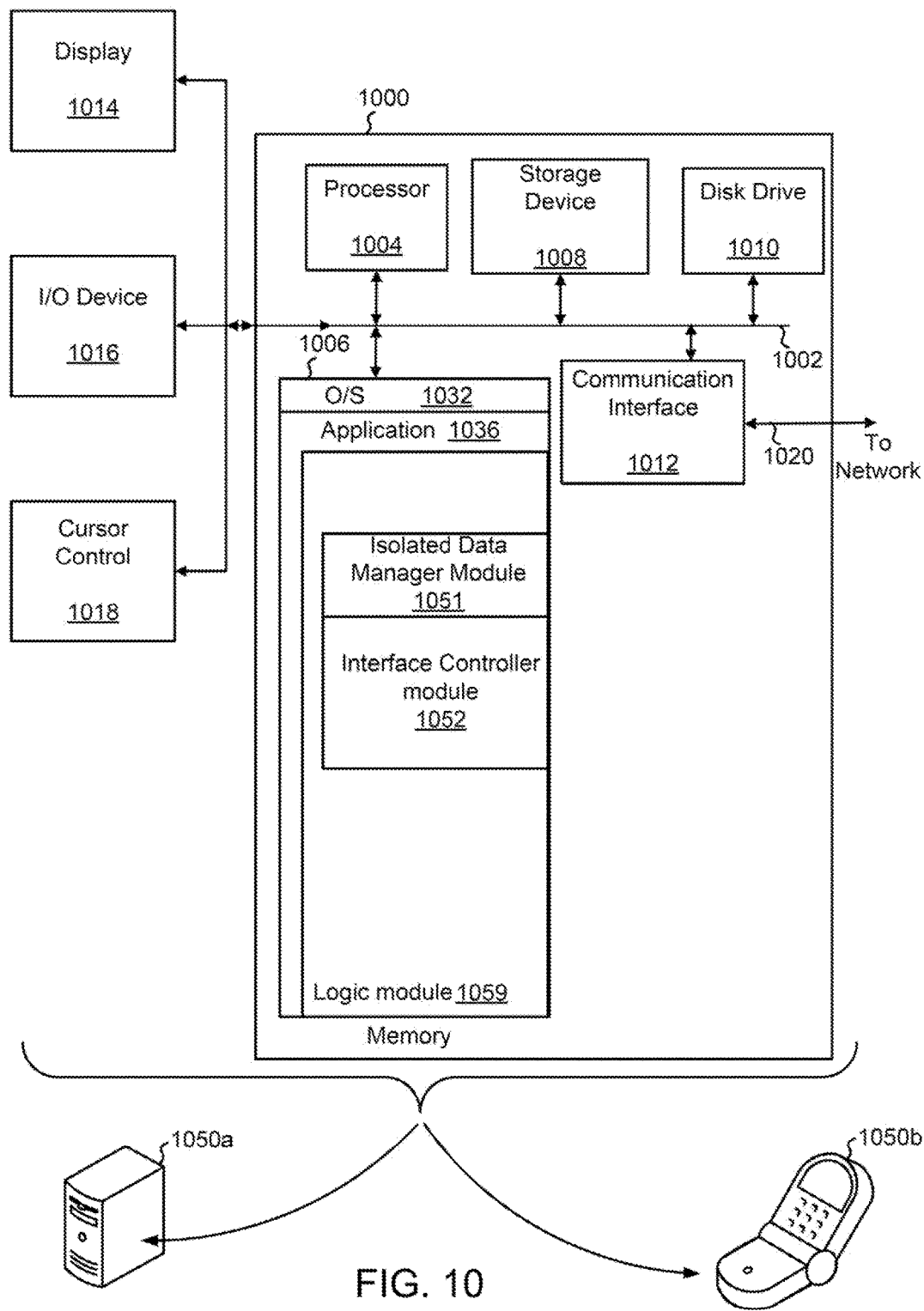
FIG. 10 illustrates an exemplary computer system suitable for implementing the functions described herein, according to at least one embodiment.

FIG. 10 illustrates an exemplary computer system suitable for implementing the functions described herein, according to-at least one embodiment of the invention. In some examples, computer system 1000 can be used to implement computer programs, applications, methods, processes, or other software to perform the above-described techniques and to realize the structures described herein. Computer system 1000 can be implemented as a mobile device 1050b or as a server 1050a, or a combination thereof. Computer system 1000 includes a bus 1002 or other communication mechanism for communicating information, which interconnects subsystems and devices, such as a processor 1004, a system memory ("memory") 1006, a storage device 1008 (e.g., ROM), a disk drive 1010 (e.g., solid state, magnetic or optical), a communication interface 1012 (e.g., modem or Ethernet card), a display 1014 (e.g., a touchscreen, a CRT or a LCD), an input device 1016 (e.g., keyboard, controls to detect interactions with a touchscreen), and a pointer cursor control 1018 (e.g., mouse, trackball, a finger). According to some examples, computer system 1000 performs specific operations in which processor 1004 executes one or more sequences of one or more instructions stored in system memory 1006. Such instructions can be read into system memory 1006 from another computer readable medium, such as static storage device 1008 or disk drive 1010. In some examples, hard-wired circuitry can be used in place of or in combination with software instructions for implementation. In the example shown, system memory 1006 includes modules of executable instructions for implementing an operation system ("O/S") 1032, and an application 1036, which can be host, server, or web services-based, as well as distributed (i.e., enterprise). In some embodiments, application 1036 can implement logic module 1059, which includes isolated data manager module 1051 and an interface controller module 1052, the functions of which are described herein. According to various embodiments, memory 1006 also can include other modules for performing other functions described herein. Note that either one or more both of isolated data manager module 1051 and interface controller module 1052 need not be implemented in computer system 1000, depending, for example, whether computer system 1000 is implemented as mobile device 1050b (e.g., as a client) or as server 1050a.

The term "computer readable medium" refers, at least in one embodiment, to any medium that participates in providing instructions to processor 1004 for execution. Such a medium can take many forms, including but not limited to, non-volatile media, volatile media, and transmission media. Non-volatile media includes, for example, optical or magnetic disks, such as disk drive 1010. Volatile media includes dynamic memory, such as system memory 1006. Transmission media includes coaxial cables, copper wire, and fiber optics, including wires that comprise bus 1002. Transmission media can also take the form of acoustic or light waves, such as those generated during radio wave and infrared data communications.

Figure 11A:
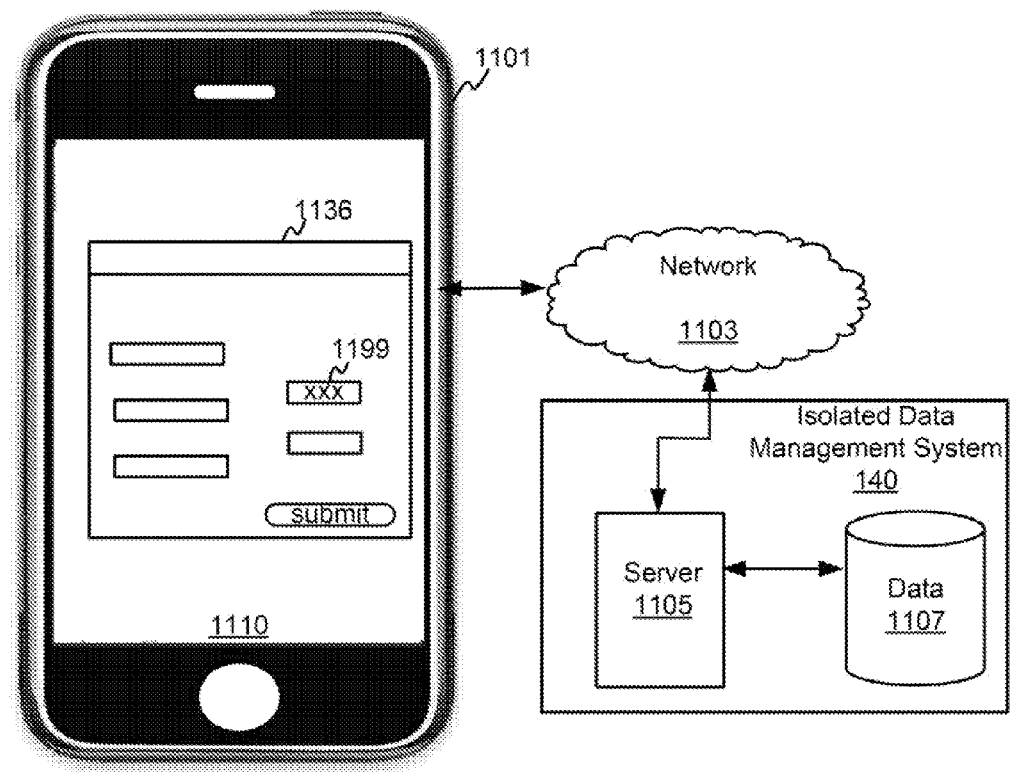
FIGS. 11A and 11B depict examples of a device including a touchscreen configured to facilitate on-line electronic payment processes in accordance with at least some embodiments.

FIG. 11A depicts an example of a device including a touchscreen configured to facilitate on-line electronic payment processes in accordance with at least some embodiments. Device 1101 includes logic configured to present a field 1199 in a touchscreen interface 1110 as part of the presentation of a window 1136. Field 1199 is configured to obtain principal data for use by an isolated data management system. In some embodiments, device 1101 is configured to exchange data via network 1103 with either server 1105, to access logic, or repository ("data") 1107 to access data. According to various embodiments, server 1105 can provide logic to provide for isolated data management and tokenization of data for storage in repository 1107. Further, any logic, structure and/or function described herein, or variants thereof, can be disposed either in device 1101 or in the combination of server 1105 and repository 1107, or distributed in both. Server 1105 can be configured to implement isolated data management system 140 of FIG. 1.

Figure 11B:
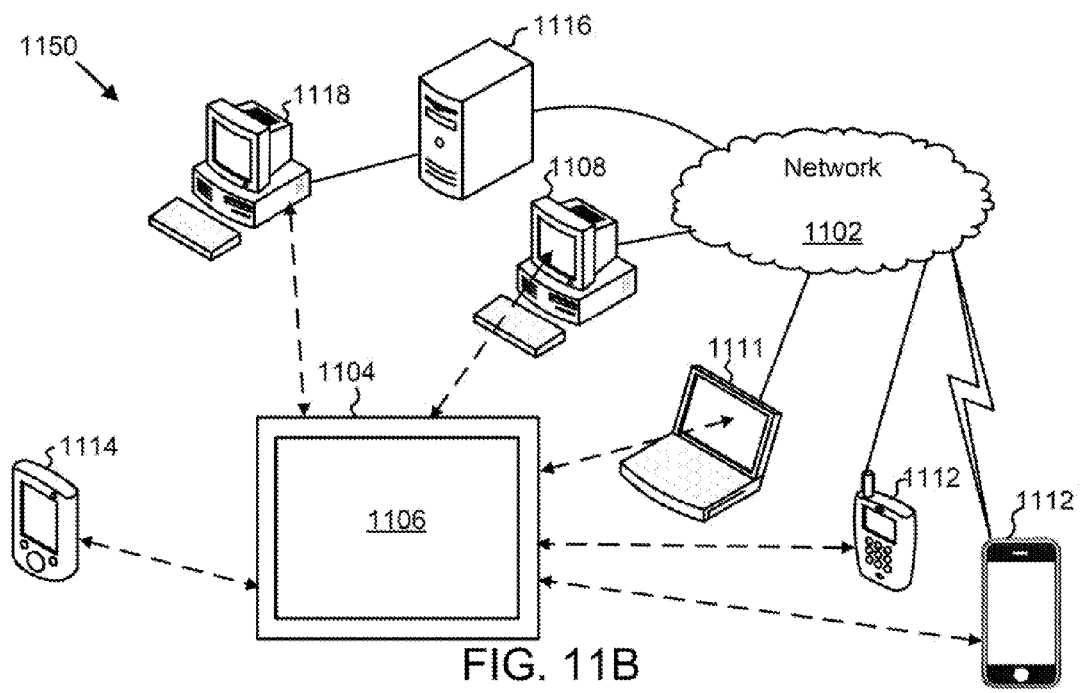

FIG. 11B illustrates an example of an interface for implementing various techniques describe herein, according to various embodiment of the invention. Here, computing device 1100 is coupled to a network 1102, a display environment 1104, an interface 1106, which can be presented on devices such as computer 1108, notebook computer ("notebook" or "laptop") 1111, mobile or smart phone 1112, personal digital assistant ("PDA") or tablet 1114, server 1116, and administrator computer 1118. In other examples, the number and type of devices can be varied and are not limited to those shown and described. In some examples, one or more panels for implementing fields for principal data can be presented on interface 1106, which can be an interface for an application, or as a web browsing program, Internet content portal, client or desktop application for any purpose. In one embodiment, interface 1106 can include any number and/or any type of display environments, such as CRT and LCD displays. Note that the above-described system and elements can be varied and are not limited to the descriptions or examples provided.

In at least some of the embodiments of the invention, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

In at least some of the embodiments of the invention, one or more of the structures and/or functions of any of the above-described features can be implemented in software, hardware, firmware, circuitry, or a combination thereof. Note that the structures and constituent elements above, as well as their functionality, can be aggregated with one or more other structures or elements. Alternatively, the elements and their functionality can be subdivided into constituent sub-elements, if any.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

The invention claimed is:

1. A computer-implemented method for facilitating segregation of data in a computer system, the computer-implemented method comprising:
    under control of a computing device executing specific computer-executable instructions,
        presenting an interface of an order management system, the interface comprising:
            a first subset of fields configured to accept a first type of data for an electronic payment transaction; and
            a second subset of fields configured to accept a second type of data for the electronic payment transaction,
            wherein the first type of data comprises in-scope data associated with a data security measure and the second type of data comprises out-of-scope data associated with another data security measure, and
            wherein the interface is presented without presentation of a third party interface of an isolated data management system, the isolated data management system separate from the order management system;
        generating, responsive to a first interaction with a first field in the first subset of fields, an initialization signal for transmission to the isolated data management system,
    wherein the isolated data management system includes a processor and a memory, and
    wherein the initialization signal is a signal to initialize a portion of the memory associated with the first field;
        receiving first data via the first field;
        determining that the first data are in a saved state;
        receiving second data via a second field of the second subset of fields; and
        segregating transmission of the first data to the isolated data management system from transmission of the second data to the order management system, wherein segregating the transmission comprises:
            generating, responsive to a second interaction with the first field when the first data are in the saved state, a save signal for transmission to the isolated data. management system, wherein the save signal is a signal to save the first data in the portion of the memory; and
            transmitting the second data to the order management system, the order management system includes another processor and other memory, and wherein the first data is not transmitted to the order management system.

2. The computer-implemented method of claim 1 further comprising:
    maintaining presentation of the first subset of fields and the second subset of fields in a window in the interface concurrently during generation of the initialization signal and the save signal and during transmission of the data from the second field.

3. The computer-implemented method of claim 2 further comprising:
    transmitting the first data to the isolated data management system and the second data to the order management system without transitioning from the window.

4. The computer-implemented method of claim 2 further comprising:
    maintaining presentation of the first field for the isolated data management system and the second field for the order management system without transitioning from an associated uniform resource locator.

5. The computer-implemented method of claim 1 further comprising:
    transmitting the first data as in-scope data to the isolated data management system over a first data path portion; and
    transmitting the second data as out-of-scope data to the order management system over a second data path portion, the first data path portion being isolated from the second data path portion.

6. The computer-implemented method of claim 1 further comprising:
    receiving data representing selection of a submit element in the interface; and
    transmitting, using circuitry of an isolated data manager, a ready signal to the isolated data management system indicating that the on-line electronic payment transaction is to be completed, the isolated data management system including the isolated data manager.

7. The computer-implemented method of claim 1 wherein generating the initialization signal further comprises:
    generating an indication that the portion of the memory is invalid.

8. The computer-implemented method of claim 7 wherein generating the initialization signal further comprises:
    activating a command in response to an event of selecting the first field.

9. The computer-implemented method of claim 1 wherein generating the save signal further comprises:
    generating an indication that data in the portion of the memory is valid.

10. The computer-implemented method of claim 7 wherein generating the save signal further comprises:
    activating a command in response to an event of deselecting the first field.

11. The computer-implemented method of claim 1 wherein receiving the first data via the first field comprises:
    receiving principal data including cardholder data and authentication data.

12. The computer-implemented method of claim 1 wherein transmitting the second data comprises:

transmitting non-cardholder data relating to a characteristic of the electronic payment transaction.

13. The method of claim 1, wherein the determining further comprises:
detecting an exiting interaction caused by a deselecting of the first field, the exiting interaction indicating that first data are in the saved state.

14. An apparatus for facilitating segregation of data in online electronic payment transactions, the apparatus comprising:
first computer-readable memory storing executable instructions; and
one or more processors in communication with the first computer-readable memory and configured to execute the executable instructions to at least:
present an interface of an order management system, the interface comprising:
a first subset of fields configured to accept a first type of data for an electronic payment transaction; and
a second subset of fields configured to accept a second type of data for the electronic payment transaction,
wherein the first type of data comprises in-scope data associated with a data security measure and the second type of data comprises out-of-scope data associated with another data security measure, and
wherein the interface is presented without presentation of a third party interface of an isolated data management system, the isolated data. management system separate from the order management system;
generate, responsive to a first interaction with a first field in the first subset of fields, an initialization signal for transmission to the isolated data management system, wherein the isolated data management system includes a processor and a second computer-readable memory, and wherein the initialization signal is a signal to initialize a portion of the second computer-readable memory associated with the first field;
receive first data via the first field;
determine that the first data are in a saved state;
receive second data via a second field of the second subset of fields; and
segregate transmission of the first data to the isolated data management system from transmission of the second data to the order management system,
wherein segregating the transmission comprises:
generate, responsive to a second interaction with the first field when the first data are in the saved state, a save signal for transmission to the isolated data management system, wherein the save signal is a signal to save the first data in the portion of the second computer-readable memory; and
transmit second data to the order management system, wherein the order management system includes another processor and a third computer-readable memory, and wherein the first data is not transmitted to the order management system.

15. The apparatus of claim 14 wherein the processor is further configured to execute the executable instructions to at least:
maintain presentation of the first field for the isolated data management system and the second field for the order management system without transitioning from an associated uniform resource locator.

16. The apparatus of claim 14 wherein the processor is further configured to execute the executable instructions to at least:
receive data representing selection of a submit element in the interface; and
transmit, using circuitry of an isolated data manager, a ready signal to the isolated data management system indicating that the on-line electronic payment transaction is to be completed, the isolated data management system including the isolated data manager.

17. The apparatus of claim 14 wherein executable instructions to generate the initialization signal further comprise executable instructions to:
generate an indication that the portion of the second computer-readable memory is invalid.

18. The apparatus of claim 14 wherein executable instructions to generate the save signal further comprise executable instructions to:
generate an indication that data in the portion of the second computer-readable memory is valid.

19. The apparatus of claim 14 wherein the processor is further configured to execute the executable instructions to at least:
detect, using state machine circuitry of a state manager disposed in a data segregation manager of the interface controller, an exiting interaction caused by a deselecting of the first field, the exiting interaction indicating that the first data are in the saved state.

20. A computer-implemented method for segregating data transmitted to an order management system from data transmitted to an isolated data management system, the computer-implemented method comprising:
under control of a computing device executing specific computer-executable instructions,
presenting an interface of the order management system, the interface comprising:
a first subset of fields configured to accept input of in-scope data for an electronic payment transaction involving the order management system and the isolated data management system, wherein the order management system is separate from the isolated data management system; and
a second subset of fields configured to accept input of out-of-scope data for the electronic payment transaction involving the order management system and the isolated data management system, wherein the in-scope data is associated with a first data security measure and the out-of-scope data is associated with a second data security measure;
receiving the input of in-scope data to a first field of the first subset of fields presented in the interface, wherein the input of the in-scope data is received without requiring presentation of an interface of the isolated data management system to accept input of the in-scope data;
in response to receiving the input of the in-scope data to the first field, transmitting an initialization signal to the isolated data management system that causes the isolated data management system to initialize a portion of memory of the isolated data management system for storage of the in-scope data;
receiving the input of out-of-scope data to a second field of the second subset of fields presented in the interface;
determining, based at least partly on the first data security measure and the second data security measure, that the in-scope data is to be segregated from the out-of-scope data; and in response to an interaction with the first field subsequent to input of the in-scope data:
transmitting the in-scope data, and not the out-of-scope data, to the isolated data management system for completion of the electronic transaction; and
transmitting the out-of-scope data to the order management system.

21. The computer-implemented method of claim 20, wherein transmitting the in-scope data to the isolated data management system uses a first data path, and wherein transmitting the out-of-scope data to the order management system uses a second data path that is different from the first data path.

22. The computer-implemented method of claim 20, wherein:
the in-scope data comprises data regarding at least one of: a cardholder name, a payment account number, a card verification value, an address verification system value, or an expiration date; and
the out-of-scope data comprises data regarding a non-cardholder characteristic of the electronic payment transaction.

* * * * *

UNITED STATES PATENT AND TRADEMARK OFFICE
CERTIFICATE OF CORRECTION

Page 1 of 1

PATENT NO.         : 9,928,498 B2
APPLICATION NO.    : 13/329182
DATED              : March 27, 2018
INVENTOR(S)        : Brent T. Schneeman It is certified that error appears in the above-identified patent and that said Letters Patent is hereby corrected as shown below:

In the Specification

In Column 5 at Line 52, Change "Compliance" to --compliance--.

In Column 7 at Line 13, Change "interlace" to --interface--.

In Column 7 at Line 14, Change "interlace" to --interface--.

In Column 11 at Line 30, Change "tie" to --be--.

In the Claims

In Column 16 at Line 2, In Claim 1, change "data." to --data--.

In Column 16 at Line 6, In Claim 1, change "the" to --wherein the--.

In Column 17 at Line 30, In Claim 14, change "data." to --data--.

Signed and Sealed this
Second Day of July, 2019

Andrei Iancu
*Director of the United States Patent and Trademark Office*